United States Patent [19]
Gelin

[11] Patent Number: 5,309,123
[45] Date of Patent: May 3, 1994

[54] DEVICE FOR CONNECTING A DATA COMMUNICATION NETWORK TO A PLURALITY OF SUBSCRIBERS

[75] Inventor: Claude Gelin, Creteil, France
[73] Assignee: Cegelec, Levallois Perret, France
[21] Appl. No.: 933,307
[22] Filed: Aug. 21, 1992

[30] Foreign Application Priority Data
Aug. 22, 1991 [FR] France .................. 91 10521

[51] Int. Cl.⁵ .............................. H03H 7/48
[52] U.S. Cl. ...................... 333/124; 375/36; 379/399
[58] Field of Search ............ 333/100, 124, 125; 178/63 E, 69 C; 379/326, 394, 397, 399, 414; 375/36

[56] References Cited

FOREIGN PATENT DOCUMENTS 0419713  4/1991 European Pat. Off. .
2224589  5/1990 United Kingdom .............. 375/36

OTHER PUBLICATIONS

Patent Abstracts of Japan, vol. 8, No. 63 (E-233)(1500) Mar. 24, 1984 & JP-58 212 245 (Fuji Xerox) Dec. 9, 1983.

Primary Examiner—Paul Gensler
Attorney, Agent, or Firm—Sughrue, Mion, Zinn, Macpeak & Seas

[57] ABSTRACT

A data communication field network has a plurality of subscribers connected to it in parallel which have a high input impedance as compared with the characteristic impedance of the network which comprises a main bus into which are inserted first drop and insert devices to constitute secondary buses each comprising two first branches. The connecting device comprises a cable assembly comprising at least two second drop and insert devices inserted into one of the first branches. Each second drop and insert device provides a tertiary bus comprising two second branches. Each tertiary bus is adapted to connect one subscriber and the second branches of the tertiary bus are interconnected at the subscriber connection so as to ensure continuity of the field network and to maintain impedance matching throughout the network.

12 Claims, 5 Drawing Sheets

DEVICE FOR CONNECTING A DATA COMMUNICATION NETWORK TO A PLURALITY OF SUBSCRIBERS

BACKGROUND OF THE INVENTION

1. Field of the Invention

The invention concerns a device for connecting a data communication network to a plurality of subscribers, a subscriber being in the present context a sender and/or a receiver of data.

2. Description of the Prior Art

Known data communication buses can convey data, for example digital data, over one or more conductors between sensors and actuators (valves, motors, pumps, etc) and control units such as programmable automatic controllers, microprocessors and dedicated computers.

Communication buses of this kind are used, for example, to provide communication between units of this type used for home management (home automation application). The connection of the various units to a communication bus common to all units is an advantageous substitute for point-to-point wiring (star network) using the de facto 40–20 mA standard. The cost of wiring is reduced because the lengths of the connecting wires are reduced, electromagnetic interference is virtually eliminated and installation is greatly facilitated.

This type of network is also used in field networks for automating product manufacturing units. A unit (sensor, actuator, computer ruggedized for use in an industrial environment, etc) is connected to the data communication bus (or main cable or TRUNK) as shown in FIG. 1.

FIG. 1 shows a field network comprising a plurality of subscribers.

A field network 10, of the Factory Instrumentation Protocol (FIP) type, for example, comprises a main cable conveying data serially over two twisted electrical conductors. The data is conveyed between subscribers CAC1, CAC2, . . . , CAC30 each consisting of a sensor, an actuator or a computer. The connection between these subscribers is made by means of drop and insert devices. A device of this kind is often called a TAP.

Both ends of the TRUNK link comprises means LT for matching the transmission line between each of the end of line TAPs TAP1 and TAP30.

The drop and insert connections made by the TAPs involve cutting the TRUNK link, inserting a TAP at the break and connecting the two sides of the link to each subscriber CAC1 through CAC30 as shown in FIG. 1A. This prevents the mismatching of the line that would occur in the case of a simple drop and insert connection from the TRUNK link to a subscriber.

The connections between each TAP and each subscriber are provided by identical cables 11 whose end opposite the TAP is fitted with a connector 12. The connector 12 shown in FIG. 1A comprises two connecting terminals 13 to which the wires from the TAP are connected in pairs to maintain the continuity of the electrical circuit. The shielding wires are not shown.

The dashed lines 14 in FIG. 1 represent the electromagnetic shielding of the subscribers connected to the shields 15 of the cables 11.

The network 10 therefore comprises the same number of TAPs and subscribers CAC.

The main drawback of this type of network is that when any new subscriber is added, for example to connect sensors and actuators of a new machine to the TRUNK line, it is necessary to insert a new TAP into the TRUNK line. The TAPs are drop and insert modules which are costly because they must meet specific standards, especially with regard to ruggedness and safety. In some cases the TRUNK links are buried and it is then necessary to excavate them to insert one or more TAPs, introducing considerable constraints in addition to the time needed to rebury the TRUNK link.

Also, because of the line mismatch that would result, it is not possible to connect in parallel with an existing cable another cable to a subscriber to be added to an existing installation.

The abstract of Japanese patent No 58.212245 in the name of FUJI XEROX K.K. describes a device for connecting main bus subscribers in the form of a drop and insert connection to the bus. Subscribers are connected in series to the drop and insert point by means of connectors. This solution has the drawback previously explained, i.e. that connecting this connecting device to the main bus produces a mismatch (the subscribers are connected in series to the bus). The impedance matching problem is not treated in this document because each subscriber can have its own input impedance and all the subscribers must be connected to the connecting device to ensure continuity.

A particular object of the present invention is to overcome these drawbacks.

To be more precise, one object of the invention is to provide a connecting device for field buses enabling at least two subscribers to be added to the bus quickly and easily without causing any mismatching of the bus.

Another object of the invention is to provide a connecting device of this kind which is less costly and easier to manufacture than those used in the prior art.

SUMMARY OF THE INVENTION

The present invention consists in a device for connecting a data communication field network to a plurality of subscribers in parallel, each subscriber having a high input impedance as compared with the characteristic impedance of the network, the network comprises a main bus into which are inserted first drop and insert devices to constitute secondary buses each comprising two first branches, said connecting device comprising a cable assembly comprising at least two second drop and insert devices inserted into one of said first branches, each second drop and insert device providing a tertiary bus comprising two second branches, each tertiary bus being adapted to connect one subscriber and said second branches of said tertiary bus being interconnected at the subscriber connection so as to ensure continuity of said field network and to maintain impedance matching throughout said network.

The second branches of the same tertiary bus are advantageously connected to each other by connecting means comprising at least one connector in which the second branches are interconnected.

These connectors are preferably standardized and comprise either four or nine pins.

The device is preferably prefabricated and made up of a predetermined number of second drop and insert devices each having connecting means.

In this way the device can be produced in a manufacturing plant and the reliability of the connections is much greater than if a drop and insert connection were made to a main bus in situ to connect a subscriber.

In a preferred embodiment the main bus comprises two electrical conductors conveying data on a differential link between the subscribers using a ground return.

The ground connection of the main bus is preferably connected to a ground connection of at least one secondary bus through one of the first drop and insert devices comprising conductive ferrules connecting the ground connections to the first drop and insert device.

The cable assembly advantageously further comprises at least a second drop and insert device providing two second branches of a tertiary bus, the second branches being applied to an amplification interface followed by another cable assembly comprising impedance matching means.

The device in accordance with the invention is preferably mounted in a subscriber receive cabinet or rack and connected to the first branches from the first drop and insert devices by a self-looping connector.

It is then easy to obtain access to the various subscribers connected to the same drop and insert device.

The invention further consists in an FIP type field network comprising a main bus interrupted by the first drop and insert devices to constitute secondary buses each comprising two first branches, the network comprising at least one connecting device as defined above.

Other features and advantages of the invention will emerge from the following description of a preferred embodiment given by way of non-limiting illustrative example only with reference to the appended diagrammatic drawings.

DETAILED DESCRIPTION OF THE INVENTION

Figure 1:
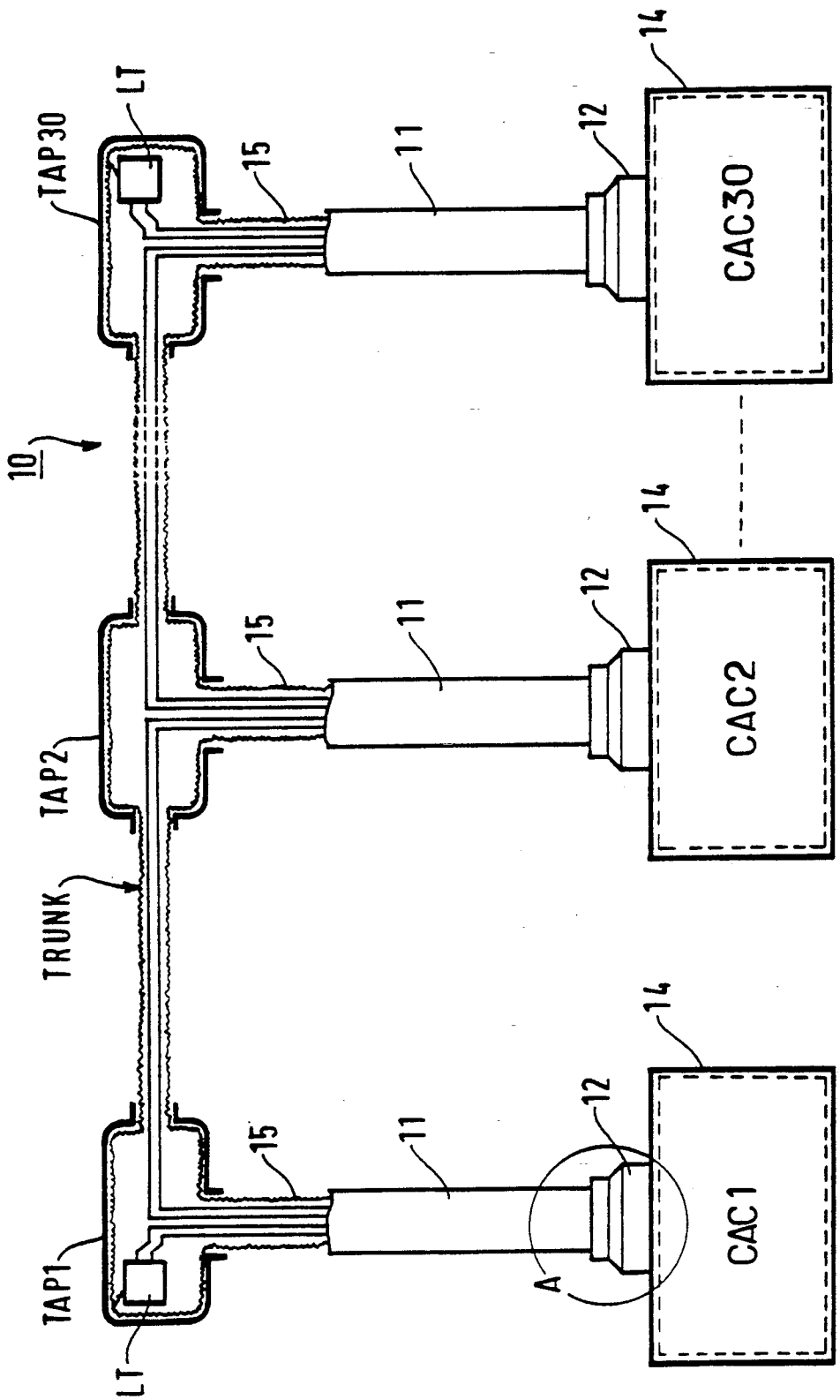
FIG. 1 shows a known type field network.
Figure 1A:
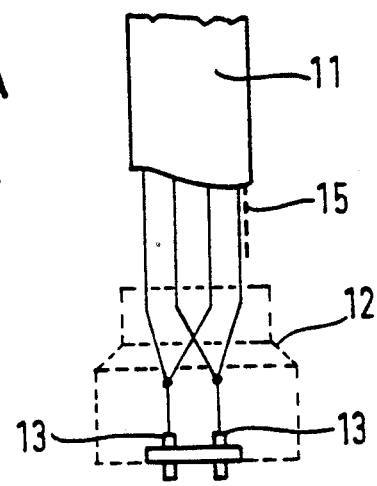
FIG. 1A shows the means of connecting a TAP to a subscriber.

FIGS. 1 and 1A have already been described in relation to the prior art.

Figure 2:
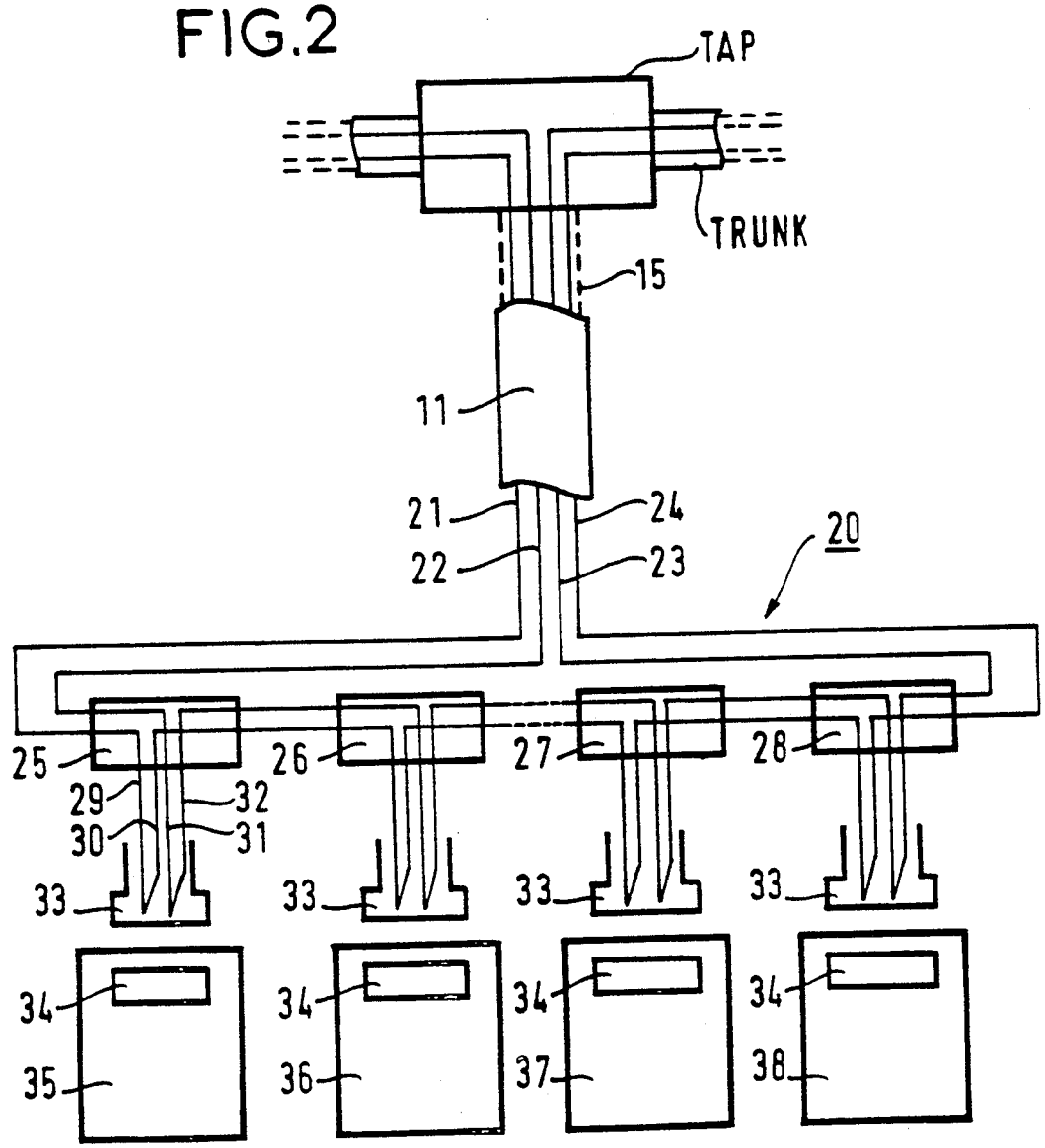
FIG. 2 shows a field network fitted with a device in accordance with the invention.

FIG. 2 shows a field network fitted with a device in accordance with the invention.

A main bus or TRUNK is interrupted by a number of drop and insert devices. Only one drop and insert device TAP is shown. The TRUNK comprises two electrical conductors, for example, conveying digital signals differentially and shielding providing protection against electromagnetic interference. The drop and insert connection involves cutting the conductors of the TRUNK and soldering or splicing them to other electrical conductors. In this embodiment this produces four electrical conductors 21, 22, 23 and 24. The conductors 21 through 24 convey data and the shield 15 is connected to a common ground of the field network. The cables 21 through 24 are housed in an insulative of cable 11 incorporating an electromagnetic shield. All the connections of a network of this kind are shielded.

The conductors 21 through 24 constitute a secondary bus with two branches 21, 22 and 23, 24.

According to the invention, a connecting device 20 is connected to the secondary bus 21 through 24 to connect subscribers 35 through 38 to the TRUNK. The connecting device 20 comprises a cable assembly comprising the same number of second drop and insert devices 25, 26, 27, 28 as the number of subscribers 35 through 38 to be connected to the TRUNK. The second drop and insert devices may be regarded as miniature TAPs and are therefore referred to as microtaps.

Each microtap provides a drop and insert connection to the conductors brought to it with the object of connecting those electrical conductors to a subscriber. In FIG. 2, the microtap 25 produces a tertiary bus comprising conductor portions 29 through 32. These conductors respectively constitute in pairs the second branches. The ends of each branch are connected together to close the bus in the immediate proximity of a subscriber. Bus continuity is therefore optimized without the introduction of subscribers disturbing the TRUNK.

The secondary bus made up of the connections 21 through 24 has a characteristic impedance equal to that of the TRUNK bus and so masks the integration of subscribers at the level of the links between the ends of the conductors 29 through 32. Also, as the secondary bus 21 through 24 may be very long, the parallel connection by connectors 33 of several subscribers 35 through 38 does not disturb the operation of the TRUNK bus. The subscribers have high input impedances relative to the impedance of the bus so that the parallel connection by their connectors 33 (socket) and 34 (plug) of several subscribers does not disturb the new bus thus produced. Impedance matching is thereby maintained throughout the network.

The connections between the ends of the second branches and the subscribers are advantageously made by standardized connectors 33 with four or nine pins.

The connectors 33 cooperate with other, mating connectors 34 in the subscribers 35 through 38.

Figure 3:
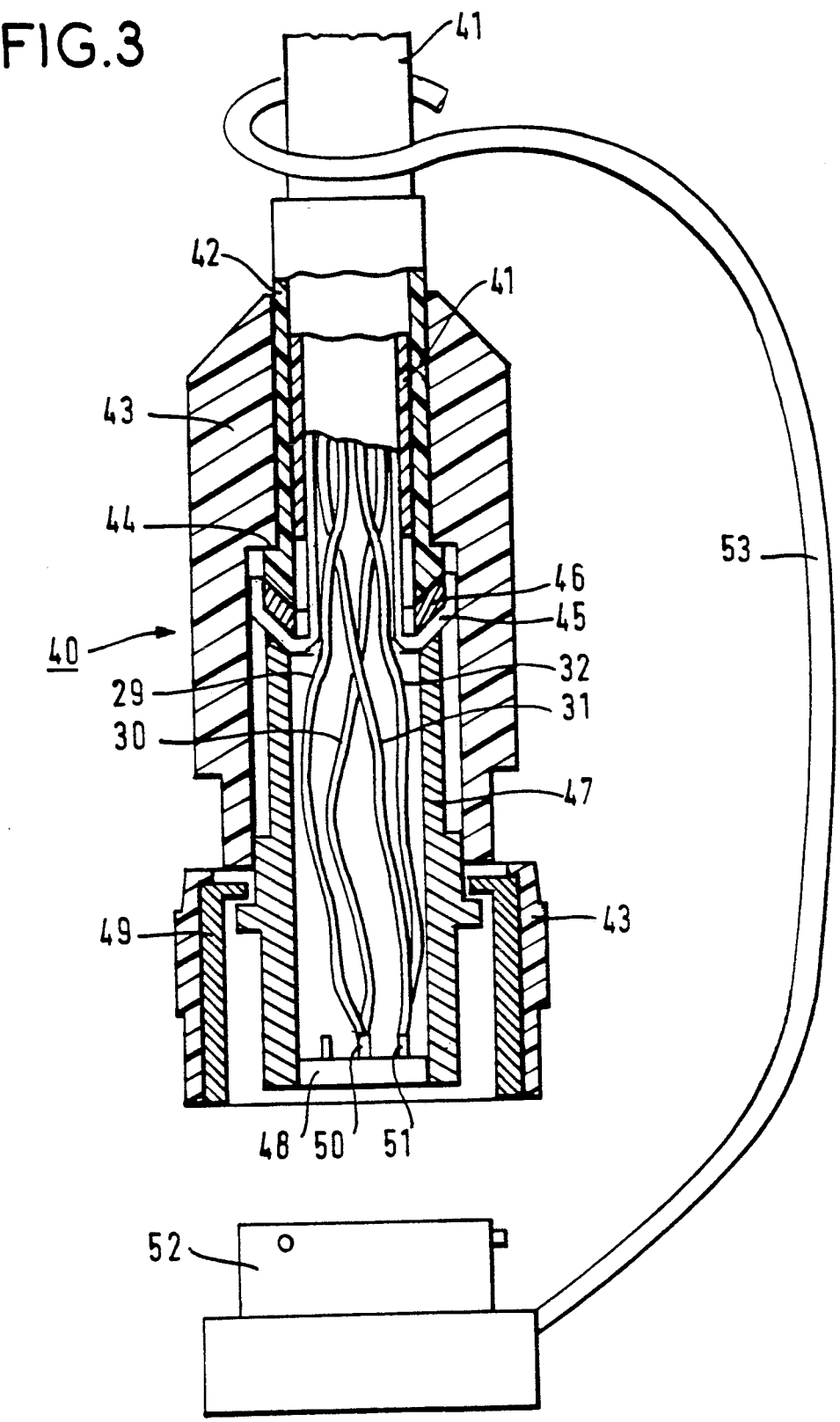
FIG. 3 is a cross-section view of one type of connector used in the FIG. 2 device.

FIG. 3 is a cross-section view of a four-pin connector procuring bus continuity and the connection to a subscriber. The connectors 33 in FIG. 2 may be of this type, for example.

The connector 40 shown is a four-pin connector of which only two pins are used for the purposes of the present invention.

The unused two pins may be used for a remote power feed, for example.

The connector receives the insulative jacket 41 of the tertiary bus in a cable sleeve 42 forming a stuffing gland. The cable sleeve 42 is enclosed in an insulative body 43 forming a clamping nut. The connector is sealed at a compression point 44. The tertiary bus comprises a shield 45 whose end enters a shield continuity ferrule 46 to provide the connection between the shield 45 and a sleeve-form metal shell 47 whose lower end ensures continuity of the shielding with a socket 48 comprising four solder or crimp type terminals. A bayonet coupling bush 49 coated with insulative material 43 cooperates with a connector (not shown) connected to a subscriber.

The cables 29 and 30 are soldered or crimped to a terminal 50 and the cables 31 and 32 likewise to another terminal 51.

The connector shown advantageously cooperates with an externally insulated ground bung 52 when the connector is not in use. The bung 52 comprises a tie 53 clipped around the tertiary bus to prevent it being lost.

Other types of connector can obviously be used, provided that they respect the constraints associated with field networks. It is also possible to connect the cables 29 to 32 directly to the subscriber without using a plug-in connector.

Using a plug-in connector is preferable, however, for obvious reasons of convenience and also for reasons for reliability. It is preferable to use a factory manufactured and tested cable assembly rather than to allow on-site work capable of disrupting operation.

Figure 4:
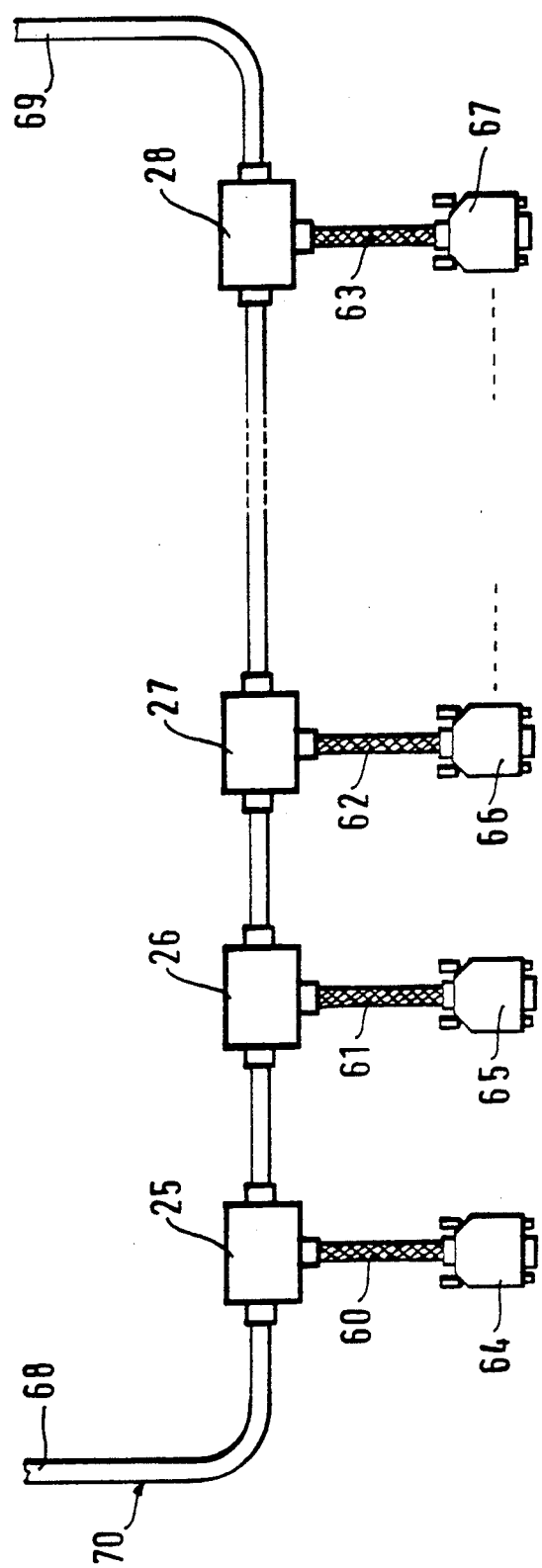
FIG. 4 shows a connecting device in accordance with the invention.

A connecting device in accordance with the invention is advantageously of the form shown in FIG. 4.

The cable assembly comprises microtaps 25 through 28 providing a secondary bus 70 branching from a TAP on a main bus. The dropped and inserted tertiary buses 60 through 63 are terminated by plug-in connectors 64 through 67 to be connected to subscribers. The ends 68, 69 of the cable assembly are either connected directly to the interior of a TAP at the main bus or terminated by a connector cooperating with a self-looping connector defining the end of a secondary bus. The tertiary buses 60 through 63 are preferably short, with a length in the order of a few tens of centimeters.

In this embodiment the cable assembly is designed to be included in a rack or cabinet far from the main bus of the field network and connected to various subscribers in the form of electronic circuit boards in the cabinet and to the main bus via a self-looping plug-in connector defining the end of a secondary bus.

The remote siting of the microtaps means that their implementation can be simplified as compared with that of the TAPs of the TRUNK (main bus) and in particular that they may be smaller. The microtaps are also lighter in weight and do not need to be as rugged as the TAPs, so that their cost is lower.

Figure 5:
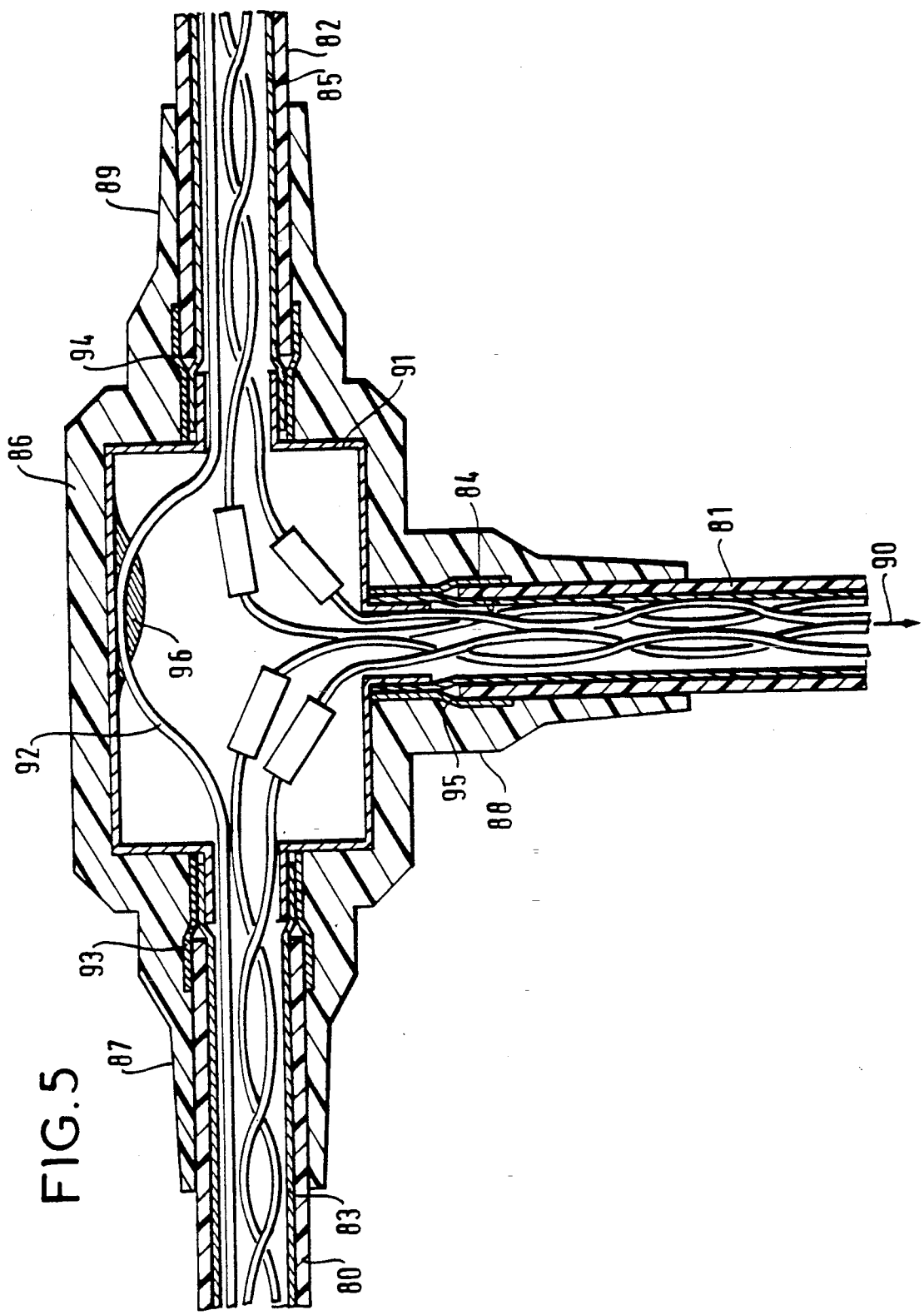
FIG. 5 is a top view of a drop and insert device used in a connecting device in accordance with the invention.

The microtaps are advantageously implemented as shown in FIG. 5. FIG. 5 is a top view of a drop and insert device used in a cable assembly in accordance with the invention.

The microtap shown receives two cables 80 and 82. One of the cables may be connected directly to a TAP on its upstream side, for example, or to another microtap. The microtap provides the drop and insert connection between the electrical conductors of the two cables and a connector indicated by the arrow 90, the four conductors being contained in a cable 81. The shield braids 83, 84 of the cables 80, 81 and 82 are connected to a metal shielding enclosure 91.

The shielding enclosure 91 is overmolded with an insulative material 86 surrounding the ends of the cables 80, 81 and 82 with integral stress relief sleeves 87, 88, 89 which also retain the cables.

The cables 80 and 82 incorporate a continuous ground lead 92 in the form of a stripped cable which advantageously passes between the two conductors of each of the cables 80 and 82. This ground lead 92 is in electrical contact with the shield braids 83 and 85 which are connected to the casing 91 by copper ferrules 93, 94. The shield braid 84 of the .cable 81 is also connected to the casing 91 by a ferrule 95.

The ferrules 93 through 95 make it easy to connect the ground conductors of the cables to the casing. The ground lead 92 is advantageously brazed at 96 to the interior of the casing 91.

The presence of a continuous ground lead 92 procures excellent grounding in a device in accordance with the invention because grounding is not interrupted on the main cable. The main cable may be the previously mentioned TRUNK bus and the casing 91 then represents a TAP.

As previously mentioned, the impedance of the cable 81 is equal to that of the cables 80 and 82 with the result that there is no mismatching.

A connecting device in accordance with the invention (FIG. 4) may also be fitted to the drop and insert channel of a microtap instead of that of a TAP. It is then necessary to insert a regenerator device between the ends of the cable assembly and the tertiary bus from the microtap. This device supplies regenerated signals to the network made up of the second cable assembly on the downstream side of a first cable assembly. In some cases LT type line terminations (FIG. 1) will be required in the new network, especially if a large number of subscribers are connected. It is thus possible to interleave a plurality of cable assemblies in accordance with the invention at the level of a TAP.

The signal communication bus is preferably of the serial type but parallel buses can equally well be implemented in the same technology.

Because the present invention is intended for industrial environment buses, all connections are advantageously duplicated to guard against possible cutting of a cable. This requires two main buses, twice as many TAPs and microtaps and duplicated connectors at the subscribers.

There is claimed:

1. A device for connecting a data communication field network to a plurality of subscribers in parallel, each subscriber having a high input impedance as compared with the characteristic impedance of said network, said network comprising a main bus into which are inserted first drop and insert devices to constitute secondary buses each comprising two first branches, said connecting device comprising:
   a cable assembly comprising at least two second drop and insert devices inserted into one of said first branches, each second drop and insert device providing a tertiary bus comprising two second branches, each tertiary bus being adapted to connect one subscriber and said second branches of said tertiary bus being interconnected at the subscriber connection so as to ensure continuity of said field network and to maintain impedance matching throughout said network.

2. The device according to claim 1 wherein said second branches of the same tertiary bus are connected to each other by connecting means comprising at least one connector in which the second branches are interconnected.

3. The device according to claim 1 is prefabricated and made up of a predetermined number of second drop and insert devices each having connecting means.

4. The device according to claim 1 wherein said bus comprises two electrical conductors conveying data on a differential link between the subscribers using a ground return.

5. The device according to claim 1 wherein a ground connection of said main bus is connected to a ground connection of at least one secondary bus through one of the first drop and insert devices comprising conductive ferrules connecting said ground connections to said first drop and insert device.

6. The device according to claim 1 wherein said cable assembly further comprises at least a second drop and insert device providing two second branches of a tertiary bus, the second branches being applied to an amplification interface followed by another cable assembly comprising impedance matching means.

7. An FIP type field network comprising a main bus interrupted by first drop and insert devices to constitute secondary buses each comprising two first branches, the network further comprising:
   at least one device, each for connecting one of said secondary busses to a plurality of subscribers in parallel and which have a high input impedance as compared with the characteristic impedance of said network, said connecting device comprising:
   a cable assembly comprising at least two second drop and insert devices inserted into one of said first branches, each second drop and insert device providing a tertiary bus comprising two second branches, each tertiary bus being adapted to connect one subscriber and said second branches of said tertiary bus being interconnected at the subscriber connection so as to ensure continuity of said field network and to maintain impedance matching throughout said network.

8. A network according to claim 7 wherein said second branches of the same tertiary bus are connected to each other by connecting means comprising at least one connector in which the second branches are interconnected.

9. The device according to claim 7 is prefabricated and made up of a predetermined number of second drop and insert devices each having connecting means.

10. The network according to claim 7 wherein said main bus comprises two electrical conductors conveying data on a differential link between the subscribers using a ground return.

11. The network according to claim 7 wherein a ground connection of said main bus is connected to a ground connection of at least one secondary bus through one of the first drop and insert devices comprising conductive ferrules connecting ground connections to said first drop and insert device.

12. The network according to claim 7 wherein said cable assembly further comprises at least a second drop and insert device providing two second branches of a tertiary bus, the second branches being applied to an amplification interface followed by another cable assembly comprising impedance matching means.

* * * * *